(12) United States Patent
Kim et al.

(10) Patent No.: US 6,683,748 B2
(45) Date of Patent: Jan. 27, 2004

(54) VERTICAL WRITING TYPE MAGNETIC HEAD

(75) Inventors: Yong-su Kim, Seoul (KR); Young-hun Im, Seoul (KR)

(73) Assignee: Samsung Electronics Co., Ltd., Kyungki-do (KR)

(*) Notice: Subject to any disclaimer, the term of this patent is extended or adjusted under 35 U.S.C. 154(b) by 57 days.

(21) Appl. No.: 09/683,131

(22) Filed: Nov. 23, 2001

(65) Prior Publication Data

US 2002/0063992 A1 May 30, 2002

(30) Foreign Application Priority Data

Nov. 24, 2000 (KR) .......................................... 2000-70488

(51) Int. Cl.[7] .............................. G11B 5/127; G11B 5/31
(52) U.S. Cl. ....................................................... 360/125
(58) Field of Search ................................ 360/110, 125, 360/126

(56) References Cited

U.S. PATENT DOCUMENTS

| | | | | | |
|---|---|---|---|---|---|
| 4,799,118 A | * | 1/1989 | Yamada et al. | ............. | 360/119 |
| 4,970,615 A | * | 11/1990 | Gau | ............ | 360/122 |
| 5,075,956 A | * | 12/1991 | Das | ............ | 29/603.14 |
| 5,555,482 A | * | 9/1996 | McNeil | ............ | 360/119 |
| 5,615,069 A | * | 3/1997 | Slade et al. | .................. | 360/122 |
| 5,655,286 A | | 8/1997 | Jones, Jr. | ................... | 29/603.13 |
| 5,831,801 A | * | 11/1998 | Shouji et al. | ............... | 360/126 |
| 5,920,449 A | * | 7/1999 | Tagawa | ....................... | 360/122 |
| 6,198,597 B1 | * | 3/2001 | Tateyama et al. | ........... | 360/122 |
| 6,282,056 B1 | * | 8/2001 | Feng et al. | .................. | 360/126 |
| 6,477,006 B1 | * | 11/2002 | Sato | ............................ | 360/126 |
| 6,504,675 B1 | * | 1/2003 | Shukh et al. | ................ | 360/125 |
| 2001/0030832 A1 | * | 10/2001 | Tomiyama et al. | ......... | 360/126 |
| 2002/0034043 A1 | * | 3/2002 | Okada et al. | ................ | 360/125 |

FOREIGN PATENT DOCUMENTS

| | | |
|---|---|---|
| DE | 3231286 A1 | 3/1983 |
| EP | 0 333 347 A2 | 3/1989 |
| JP | 3-8105 A * | 1/1991 |

* cited by examiner

*Primary Examiner*—Julie Anne Watko
(74) *Attorney, Agent, or Firm*—Burns, Doane, Swecker & Mathis, LLP

(57) ABSTRACT

Provided is a vertical writing type magnetic head including a substrate, a bottom pole formed on the substrate, and a top pole aligned with and spaced a predetermined distance apart from the bottom pole, wherein the bottom pole has a narrower width than the top pole. The magnetic write head is constructed such that the width of a bottom pole is narrower than that of a top pole, thereby reducing extension of a magnetic field at sides of a top pole and effectively preventing erasure of information of an adjacent track due to the bottom pole overlapping the adjacent track when there is a constructional skew in a hard disk drive.

16 Claims, 6 Drawing Sheets

VERTICAL WRITING TYPE MAGNETIC HEAD

BACKGROUND OF THE INVENTION

Priority is claimed to Patent Application Number 2000-70488, filed n the Republic of Korea on Nov. 24, 2000, the contents of which are herein incorporated by reference.

1. Field of the Invention

The present invention relates to a magnetic head for writing/reading a magnetic signal on/from a recording medium, and more particularly, to a vertical writing type magnetic head having improved top and bottom poles for writing a magnetic signal.

2. Description of the Related Art

In general, an apparatus for writing/reading a magnetic signal on/from a recording medium, e.g., a hard disk drive, includes a magnetic head for writing and reading information. A magnetic head 10, as shown in FIG. 1, is installed in a slider 20 provided at one end of a swing arm 30, and moves to a track being at a desired position on a recording medium (not shown) by rotation of the swing arm 30 to perform a write or read operation.

FIG. 2 is an enlarged view of the magnetic head 10 shown in FIG. 1. As shown in FIG. 2, the magnetic head 10 includes a magneto-resistive head 14 for reading information and an inductive write head for writing information. The magneto-resistive head 14 reads a magnetic signal written on a recording medium, and the inductive write head including a top pole 11 and a bottom pole 12 for producing a leak of a magnetic flux passing through the recording layer of the recording medium, and a write coil 13 used as a current supply route, writes given information on a recording medium.

The inductive write head affects the quality of a signal written on a recording medium. That is, if inputting by the inductive write head is not clearly performed, reproduction cannot be satisfactorily performed even if the performance of the magneto-resistive head 14 is excellent.

However, in order to increase storage capacity, the recent tendency of recording mediums is toward reduction in the width of a track onto which a magnetic signal is input. Such reduction of the track width makes it necessary to reduce the width (w) of the top pole 11 and bottom pole 12 of the inductive write head for inputting the magnetic signal.

FIG. 3 shows the distribution of a magnetic field produced by a top pole and a bottom pole in a conventional inductive write head, and FIG. 4 shows the position of tracks and a head in the case where the head has a predetermined skew angle with respect to tracks of a recording medium.

Referring to FIG. 3, a magnetic field produced around the top pole infiltrates into either side of the bottom pole from the top pole as the magnetic field increases from both sides of a portion facing the bottom pole. As described above, this magnetic field deviates from the pertinent track and affects adjacent tracks.

As shown in FIG. 4, there is a skew angle θ between the head of a swing arm type information recording apparatus and the tracks of a recording medium, which varies according to the position of a head. Most information recording apparatuses are constructed such that the skew angle θ becomes zero at the innermost track. However, at outer tracks, as the track width is reduced, the bottom pole 12 of the head positioned on a given track T1 overlaps an adjacent track T2 due to the skew angle θ.

In a vertical writing type magnetic head, the bottom pole 12 erases information from the corresponding track T1 by vertical magnetism and the top pole 11 writes information. As shown in FIG. 4, the top pole 11 and the bottom pole 12 are tilted with respect to the tracks by the skew angle θ, causing the top pole 11 for writing information to be positioned on the pertinent track T1 and the bottom pole 12 for erasing information to be positioned to overlap the adjacent track T2. Thus, during writing of information, the bottom pole 12 erases information from both the pertinent track T1 and the adjacent track T2.

The overlapping of the bottom pole 12 with the adjacent track T2 becomes more severe as the track density increases, thus becoming a problem in increasing recording density.

SUMMARY OF INVENTION

To solve the above-described problems, it is an object of the present invention to provide a vertical writing type magnetic head which can effectively suppress the effect of a magnetic field on an adjacent track.

It is another object of the present invention to provide a vertical writing type magnetic head which can be used with information recording media of higher density.

To accomplish the above objects, there is provided a vertical writing type magnetic head including a substrate, a bottom pole formed on the substrate, and a top pole aligned with and spaced a predetermined distance apart from the bottom pole, wherein the bottom pole has a narrower width than the top pole.

BRIEF DESCRIPTION OF DRAWINGS

The above objects and advantages of the present invention will become more apparent by describing in detail preferred embodiments thereof with reference to the attached drawings in which.

DETAILED DESCRIPTION

Preferred embodiments of the present invention will now be described with reference to the accompanying drawings.

Figure 5:
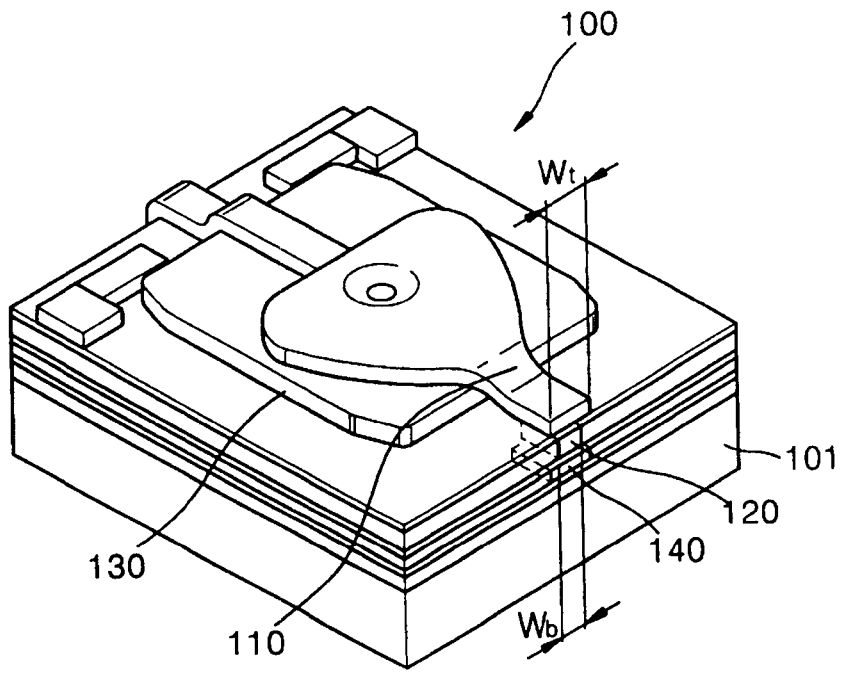
FIG. 5 is a perspective view of a magnetic head of an embodiment of the present invention.

Referring to FIG. 5, a magnetic head 100 according to an embodiment of the present invention includes a magnetoresistive head 140 for reading information from a recording medium and an inductive write head for writing information on the recording medium, on a substrate 101. The magnetoresistive head 140 detects a magnetic signal written on the recording medium. The inductive write head including a top pole 110, a bottom pole 120, and a write coil 130 used as a current supply route, produces a leak of a magnetic flux for writing given information on a recording medium.

Figure 6:
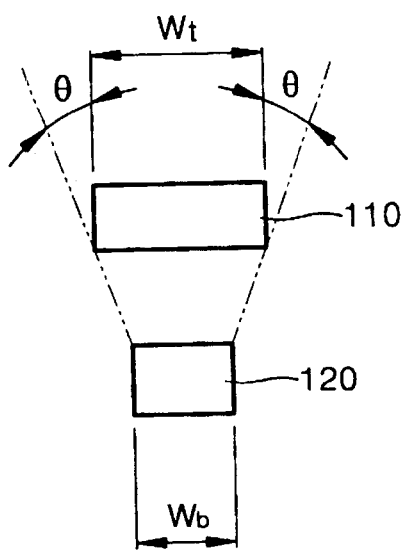
FIG. 6 shows the position of a top pole and a bottom pole of the magnetic head shown in FIG. 5.

As shown in FIGS. 5 and 6, the present invention is characterized in that the width Wb of the bottom pole 120 is less than the width Wt of the top pole 110. Preferably, a line connecting closest corners of the top pole 110 and the bottom pole 120 forms an angle of approximately 10° with respect to the axis of symmetry of the top pole 110 and the bottom pole 120. Also, the width of the bottom pole 120 is preferably less than a track width.

Figure 1:
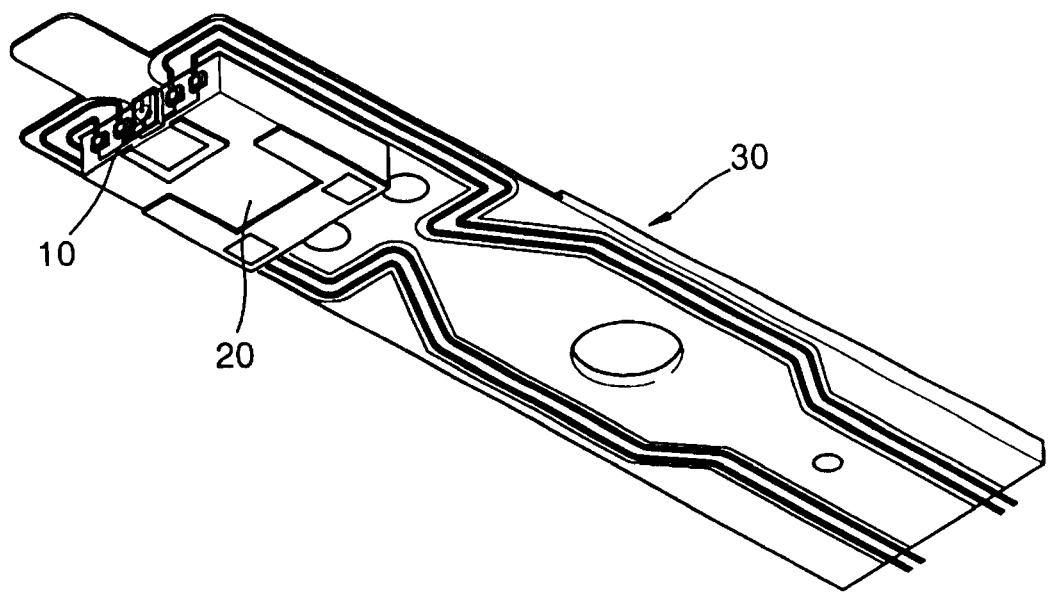
FIG. 1 is a diagram of a swing arm adopting a general magnetic head.
Figure 2:
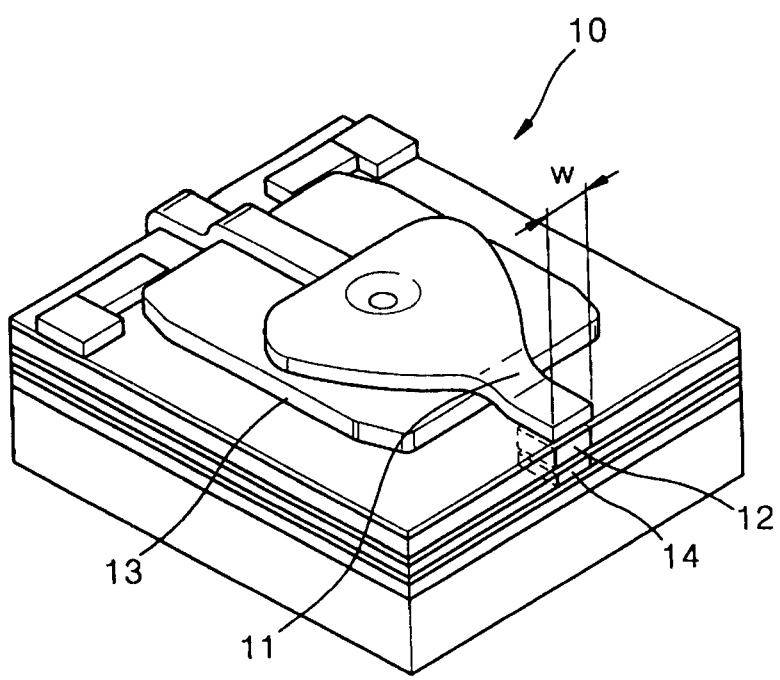
FIG. 2 is a perspective view of a conventional magnetic head.
Figure 3:
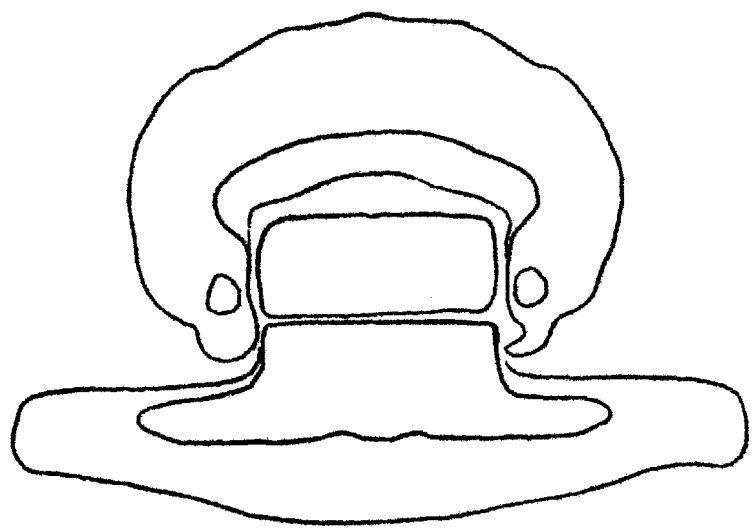
FIG. 3 shows the distribution of a magnetic field generated by the conventional magnetic head shown in FIG. 2.
Figure 4:
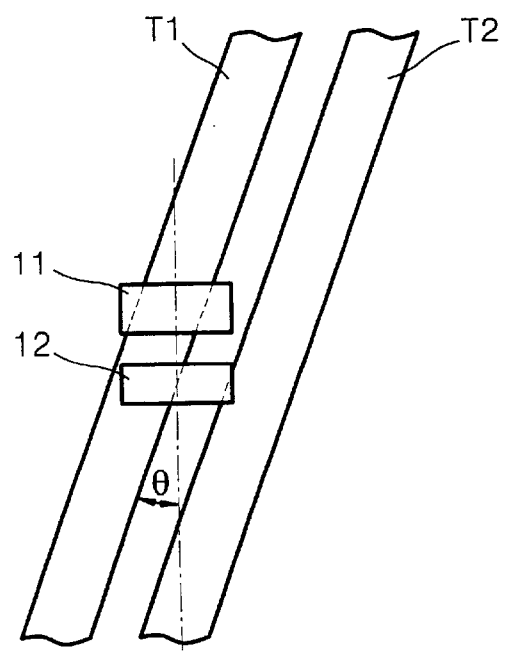
FIG. 4 shows the position of the conventional magnetic head shown in FIG. 2 with respect to tracks of an information recording medium.
Figure 7:
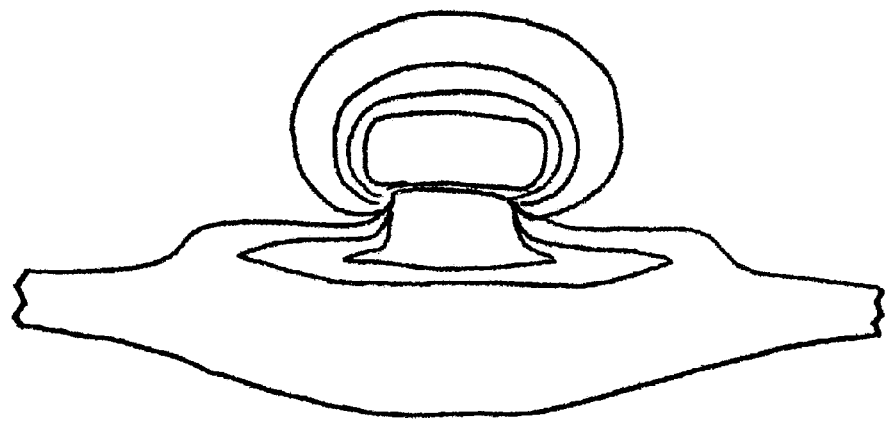
FIG. 7 shows the distribution of a magnetic field generated by the magnetic head shown in FIG. 5.

FIG. 7 shows the distribution of a magnetic field generated by the magnetic head shown in FIG. 5. As shown in FIG. 7, the width of the bottom pole is less than that of the top pole. Also, unlike in FIG. 3, a smooth, regular magnetic field is formed around the bottom pole and top pole. In particular, a magnetic field is not greatly increased at sides of the top pole but is uniformly distributed around both poles and does not severely extend out to the sides between the top and bottom poles. This reduced edge effect is caused by making the width of the bottom pole narrower than that of the top pole, which is a feature of the present invention.

Figure 8:
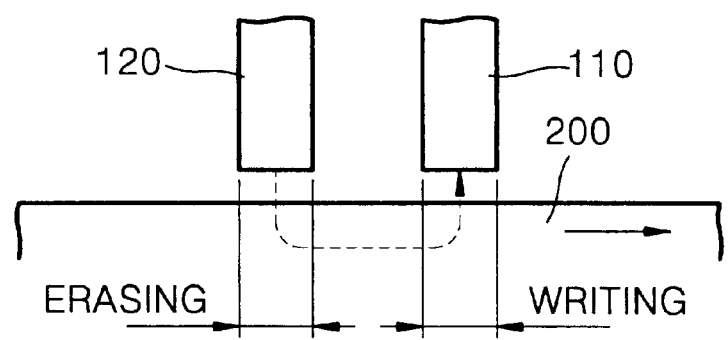
FIG. 8 is a diagram for explaining erasing and writing of information by a top pole and a bottom pole of a vertical writing type magnetic head.

FIG. 8 is a diagram for explaining erasing and writing of information by a top pole and a bottom pole of a vertical writing type magnetic head. As shown in FIG. 8, an information write plane 200 is moved in one direction (to the right in the drawing), information of each track is erased at the bottom pole 120 by vertical magnetism and new information is written by the top pole 110.

Figure 9:
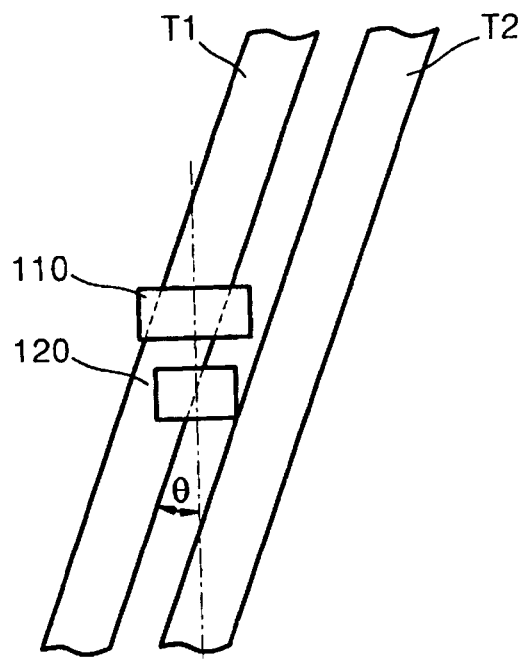
FIG. 9 shows the position of the magnetic head according to the present invention with respect to tracks of an information recording medium.

FIG. 9 shows the position of the magnetic head according to the present invention with respect to tracks of an information recording medium. As shown in FIG. 9, a head is held at a predetermined skew angle θ with respect to tracks, that is, the top pole 110 and the bottom pole 120 are held at the skew angle with respect to the tracks. Here, the relatively wide top pole 110 corresponding to a writing point is positioned in the center of a pertinent track T1, and the relatively narrow bottom pole 120 is inclined toward one side of the track T1 without extending to the adjacent track T2. Thus, the bottom pole 120 corresponding to an erasing point performs erasure on track T1 only.

According to the present invention, the width of the bottom pole can be made as narrow as necessary as long as it is still capable of forming a magnetic circuit in cooperation with the top pole.

Figure 10:
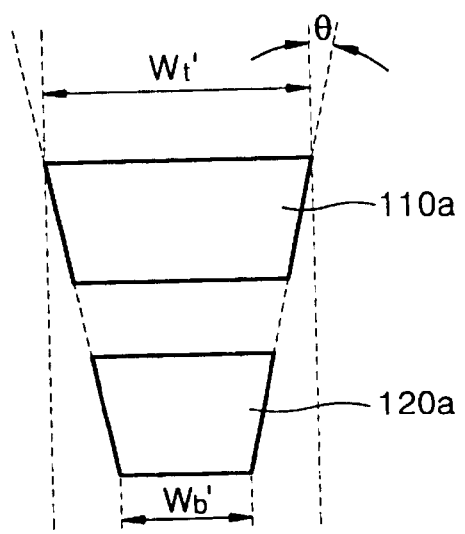
FIG. 10 shows a top pole and a bottom pole of a magnetic head according to another embodiment of the present invention.
Figure 11:
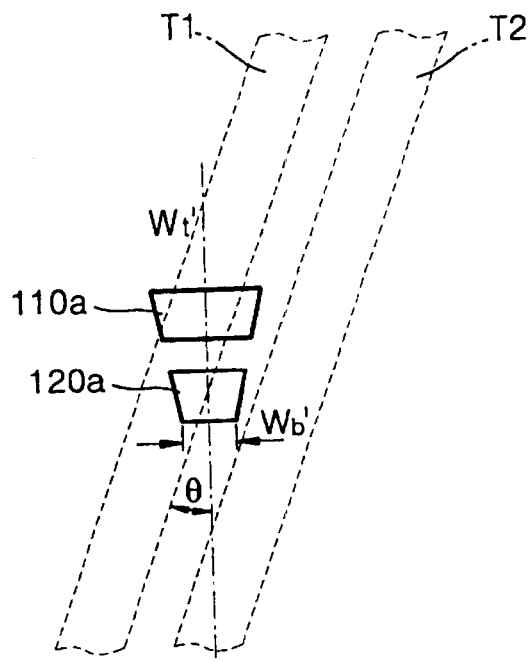
FIG. 11 shows the position of the top pole and bottom pole of the magnetic head shown in FIG. 10.

FIG. 10 shows a top pole and a bottom pole of a magnetic head according to another embodiment of the present invention and FIG. 11 shows the position of the top pole and bottom pole of the magnetic head shown in FIG. 10. A bottom pole 120a having a relatively narrow width $W_b'$ and a top pole 110a having a relatively wide width $W_t'$ have a trapezoidal shape. Here, the sides of the bottom pole 120a and top pole 110a are sloped at a skew angle θ of the tracks T1 and T2.

Figure 12:
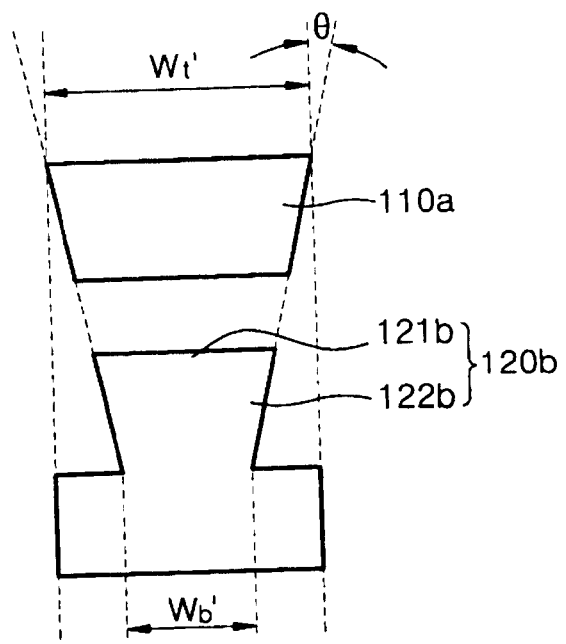
FIG. 12 shows a top pole and a bottom pole of a magnetic head according to still another embodiment of the present invention.

FIG. 12 shows a top pole and a bottom pole of a magnetic head according to still another embodiment of the present invention.

A top pole 110a has the same shape as that of the top pole 110a shown in FIGS. 10 and 11, and a bottom pole 120b includes an upper element 121b and a lower element 122b for generating a magnetic field for writing information. The upper element 121b corresponds to the bottom pole 120a shown in FIGS. 10 and 11, and the lower element 122b for supporting the bottom pole 120b has a wider width than the upper element 121b. In this embodiment, the sides of the top pole 110a and the upper element 122b of the bottom pole 120b are sloped at a skew angle θ.

According to the embodiments shown in FIGS. 10 through 12, the slopes of the sides of the top pole and bottom pole are equal to or less than a skew angle, preferably equal to a skew angle, thereby more effectively preventing overlapping of adjacent tracks due to skew of a magnetic head with respect to tracks.

In writing a magnetic signal on magnetic recording media, the magnetic write head according to the present invention is constructed such that the width of a bottom pole is narrower than that of a top pole, thereby reducing extension of a magnetic field at sides of a top pole and effectively preventing erasure of information of an adjacent track due to the bottom pole overlapping the adjacent track when there is a constructional skew in a hard disk drive. Therefore, according to the present invention, problems arising due to a skew angle unavoidably occurring in an information recording apparatus using a swing arm can be effectively solved. The magnetic write head according to the present invention can overcome the disadvantages of the conventional vertical writing type magnetic head, realizing a vertical, high-density write operation.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A vertical writing type magnetic head comprising:
   a substrate;
   a bottom pole formed on the substrate; and
   a top pole aligned with and spaced a predetermined distance apart from the bottom pole, wherein the bottom pole at an edge intended to be adjacent to magnetic media has a trapezoidal shape and is narrower at its largest width than the smallest width of the top pole at an edge, having a trapezoidal shape, intended to be adjacent to the magnetic media.

2. The magnetic head of claim 1, wherein the width of the bottom pole is narrower than the width of a track provided on a recording medium.

3. The magnetic head of claim 1, wherein a line connecting closest corners of the top pole and the bottom pole is held at an angle of approximately 10° or less with respect to the axis of symmetry of the bottom pole and the top pole.

4. The magnetic head of claim 1, wherein sides of trapezoidal shaped edge of the top and bottom poles are sloped at a same predetermined absolute angle.

5. The magnetic head of claim 4, wherein the angle of the slope of the sides of the top pole and the bottom pole is equal to or less than a skew angle of the magnetic head with respect to tracks.

6. A vertical writing type magnetic head comprising:
   a substrate;
   a bottom pole formed on the substrate; and
   a top pole aligned with and spaced a predetermined distance apart from the bottom pole, wherein a side of the bottom pole is formed at an acute angle with respect to a side of the bottom pole adjacent to the top pole, said acute angle being equal to or less than a skew angle of tracks of a recording media to prevent overlapping of adjacent tracks by the bottom pole due to skew of a said magnetic head with respect to tracks.

7. The magnetic head of claim 6, wherein the width of the bottom pole is narrower than the width of a track provided on a recording medium.

8. The magnetic head of claim 6, wherein a line connecting closest corners of the top pole and the bottom pole is held at an angle of approximately 10° or less with respect to the axis of symmetry of the bottom pole and the top pole.

9. The magnetic head of claim 6, wherein the top pole and the bottom pole have trapezoidal shapes, the non-parallel sides sloped at a same predetermined absolute angle.

10. The magnetic head of claim 6, wherein the bottom pole includes an upper element having the shape of a trapezoid with non-parallel sides sloped at a same predetermined absolute angle, and a lower element for supporting the bottom pole and having a wider width than the upper element.

11. A vertical writing type magnetic head comprising:
a substrate;
a bottom pole formed on the substrate; and
a top pole aligned with and spaced a predetermined distance apart from the bottom pole, wherein the bottom pole at an edge intended to be adjacent to magnetic media has a trapezoidal shape and the top pole at an edge intended to be adjacent to the magnetic media has a trapezoidal shape.

12. The magnetic head of claim 11, wherein the trapezoidal shaped edge of the bottom pole includes an upper element that is a trapezoid with its non-parallel sides sloped at a same predetermined absolute angle, and a lower element for supporting the bottom pole and having a wider width than the upper element.

13. The magnetic head of claim 11, wherein the angle of the slope of the sides of the top pole and the bottom pole is equal to or less than a skew angle of the magnetic head with respect to tracks and wherein the bottom pole includes an upper element having the shape of a trapezoid with all of its non-parallel sides sloped at a same predetermined absolute angle, and a lower element for supporting the bottom pole and having a wider width than the upper element of the bottom pole.

14. The magnetic head of claim 11, wherein the width of the bottom pole is narrower than the width of a track provided on a recording medium.

15. The magnetic head of claim 11, wherein a line connecting closest corners of the top pole and the bottom pole is held at an angle of approximately 10° or less with respect to the axis of symmetry of the bottom pole and the top pole.

16. The magnetic head of claim 11, wherein the angle of the slope of the non-parallel sides of the trapezoids is equal to or less than a skew angle of the magnetic head with respect to tracks.

* * * * *